United States Patent [19]
Auguste et al.

[11] Patent Number: 6,162,858
[45] Date of Patent: Dec. 19, 2000

[54] PRINTABLE ADHESIVE COMPOSITE

[75] Inventors: Stéphane Auguste, Quétigny; Marie-Louise Buisson, Longvic, both of France

[73] Assignee: Plasto, SA, Chenove, France

[21] Appl. No.: 09/176,729

[22] Filed: Oct. 21, 1998

[30] Foreign Application Priority Data

Oct. 24, 1997 [FR] France .................................. 97 13356

[51] Int. Cl.[7] ...................................................... C08K 3/00
[52] U.S. Cl. ........................................... 524/492; 524/493
[58] Field of Search ..................................... 524/492, 493

[56] References Cited

U.S. PATENT DOCUMENTS

| | | | |
|---|---|---|---|
| 3,932,330 | 1/1976 | Lakshmanan | 260/27 |
| 4,248,770 | 2/1981 | Matsuo et al. | 260/104 |
| 5,639,530 | 6/1997 | Miron et al. | 428/40.1 |

FOREIGN PATENT DOCUMENTS

| | | |
|---|---|---|
| 9713356000 | 10/1997 | France . |
| 06105515 | 5/1994 | Japan . |

*Primary Examiner*—Edward J. Cain
*Attorney, Agent, or Firm*—St. Onge Steward Johnston & Reens LLC

[57] ABSTRACT

The present invention relates to a composite of the printing-writing medium/adhesive type, in which the said printing-writing medium consists of a polyolefin in sheet form and is provided on one of its sides with the said adhesive, the said composite being characterized in that it consists of:

(A) a printing-writing medium in the form of a microporous sheet of polyolefin of high molecular weight, and (B) a pressure-sensitive adhesive without a plasticizer and containing
  (1) 90 to 160 parts by weight of a rosin resin having an average molecular weight (AMW) of between 600 and 1500 and a softening point above 85° C., per
  (2) 100 parts by weight of an elastomer polymer material consisting of or containing at least one polyisoprene compound.

This composite is especially useful for producing labels intended for the identification of blood bags made of SEBS or EVA.

10 Claims, No Drawings

PRINTABLE ADHESIVE COMPOSITE

FIELD OF THE INVENTION

The present invention relates to a printable adhesive composite as a novel industrial product, this composite being of the type comprising a printing-writing medium provided on one of its sides with an adhesive, the adhesive strength of which remains excellent in an environment normally considered as unfavourable. In particular, it relates to self-adhesive labels which consist of the said composite in sheet form and which are especially intended to identify blood bags.

PRIOR ART

Many objects (namely articles possibly housed in their packaging) in every day life or in industry are each identified by means of a label that is fixed either to the article itself or to its packaging. In most cases, for example when the packaging is made of cardboard or when the articles are made of a plastic such as, for example, ABS or rigid PVC, fixing a paper label by means of a pressure-sensitive adhesive (i.e. a sticker) or a water-activated adhesive causes no particular difficulty and there are many technical solutions giving satisfactory results.

The problem becomes more difficult to solve when it is a question of permanently fixing a label to an object exposed to large temperature variations and to high degrees of humidity. The printing-writing medium must then withstand water and/or humidity; paper, normally used because of its low cost and its good compatibility with most adhesives, is no longer suitable for applications in such an environment. The same applies when the labelled objects must undergo large temperature variations, such as, for example, flexible plastic bags which are used (i) for packaging and storing blood in blood transfusion centres and (ii) for transporting it and which must withstand certain periods at temperatures above 100° C. during the sterilization operations and other periods at temperatures below −20° C. in the case of freezing; under these extremely variable and stressful conditions, the printing-writing medium of the composite forming the label, on the one hand, must remain flexible and dimensionally stable, in order not to crease or tear, and the adhesive, on the other hand, must not creep or dry out in order, on the one hand, not to lose its adhesive strength and, on the other hand, to ensure that the label does not become detached from its substrate.

It should be understood that, in the special case of objects exposed to such environmental conditions, it is particularly difficult to find a medium/adhesive assembly capable of forming a suitable labelling material. Films of microporous synthetic material are then used, as media, on which one or more items of information may be printed and/or written, and which are capable of permanently retaining each printed or written item of information. Among the known examples of these microporous materials designed for such an application are polyethylenes of very high molecular weight which are highly filled with silica and have a microporous structure, for example the product range sold by PPG Industries under the trademark TESLIN®.

This type of medium is particularly suitable for the manufacture of labels intended for blood bags, as document EP-A-0,592,620 bears testimony, this document claiming a label whose porosity is particularly suitable for the gas exchange necessary in blood preservation. This type of porous medium also has a good adhesive strength: according to document EP-A-0,611,386, which claims a label to be fixed to receiving objects made of highly plasticized PVC, the porosity of the medium is particularly useful for absorbing the plasticizers which migrate from PVC through the adhesive.

However, in use it appears that this type of medium, which can be printed and/or written on and which is particularly strong over a wide temperature and humidity range, is extremely difficult to combine with a pressure-sensitive adhesive which is capable of withstanding the same unfavourable environment, while at the same time maintaining its adhesive strength. This is because the porous medium tends to degrade the adhesive, which gradually loses its adhesive strength and, consequently, its function of providing a reliable bond between the printing-writing medium of the label and the object to be identified.

One technical solution consists in using a complex film medium, composed of a printable plastic skin which is combined with an impermeable polyethylene film, and in adding an adhesive to the polyethylene film, as recommended by EP-A-0,158925. In this way, labels are obtained whose adhesive is not in direct contact with the porous medium; however, the whole assembly is more expensive and the labels obtained are gas-impermeable, thereby compromising certain applications, such as the identification of blood bags for example, and adversely affecting the adhesive strength of the assembly when the labels have to withstand high temperatures.

Moreover, labels are known which consist of a porous medium and an acrylic-type adhesive formulated from acrylic acid and esters of acrylic or methacrylic acid. The various embodiments of composites comprising this type of adhesive, which have been tested, have all shown insufficient adhesive strength, especially after exposure to high temperatures (especially up to about 125° C.) to low temperatures (especially down to about −30° C.) and/or to high levels of humidity, i.e. the drastic ambient conditions to which blood bags are generally subjected. In particular, it has been found, by using different acrylic adhesives in a series of tests and after labels consisting of composites of the printing-writing medium/adhesive type have been applied to sheets of flexible plastic based on a triblock elastomer of the SEBS [styrene-(ethylene-butylene)-styrene] type, that the said labels either disbonded from themselves or could be pulled off without great difficulty.

OBJECT OF THE INVENTION

In light of the inadequacies of the prior art, the object of the invention is to provide a novel technical solution making it possible to solve the problem (i) of the adhesion of a composite of the printing-writing medium/adhesive type to an object and (ii) of the dimensional stability of the said composite, when the said composite is subjected to drastic or severe environmental conditions, such as a wide temperature range and high levels of humidity.

Another object of the invention is to provide pressure-sensitive labels (i.e. stickers) capable of bearing one or more printed and/or hand-written identifications and intended especially to be fixed to blood bags presently made of a gas-permeable plastic such as SEBS or EVA (ethylene-vinyl acetate), the said labels being produced from a said composite of the printing-writing medium/adhesive type.

SUBJECT OF THE INVENTION

In order to solve the aforementioned technical problem, the invention provides a novel solution making use of a composite of the printing-writing medium/adhesive type in which the adhesive, which contains no plasticizer, consists of a particular blend of rosin resin and elastomer.

More specifically, the invention recommends a composite of the printing-writing medium/adhesive type, in which the said printing-writing medium consists of a polyolefin in sheet form and is provided on one of its sides with the said adhesive, the said composite being characterized in that it consists of:

(A) a printing-writing medium in the form of a microporous sheet of polyolefin of high molecular weight, and (B) a pressure-sensitive adhesive without a plasticizer and containing
   (1) 90 to 160 parts by weight of a rosin resin having an average molecular weight (AMW) of between 600 and 1500 and a softening point above 85° C., per
   (2) 100 parts by weight of an elastomer polymer material consisting of or containing at least one polyisoprene compound.

The invention also recommends a material in sheet form, consisting of the said composite of the printing-writing medium/adhesive type, in which the printing-writing medium has a thickness of between 100 and 250 $\mu$m and is coated with 25 to 60 g/m$^2$ of the said adhesive.

Finally, the invention recommends a label consisting of the said composite or the said material in sheet form and intended for the identification of an object whose surface receiving the label essentially consists of a synthetic elastomer of the SEBS triblock type or the EVA type, and more particularly when the said object is subjected (i) to large temperature variations and (ii) to humidity.

By way of a non-limiting example of an application, the invention provides a practical and reliable means for identifying blood bags.

DETAILED DESCRIPTION

The composite according to the invention comprises a microporous printing-writing medium based on a high-molecular-weight polyolefin, on the one hand, and a plasticizer-free pressure-sensitive adhesive containing 90 to 160 parts of a rosin-based resin, the AMW of which is between 600 and 1500 and the softening point of which is above 85° C. even above 90° C., per 100 parts of elastomer composed of at least one polyisoprene-based elastomer, on the other hand.

The polyolefin-based medium is microporous, is composed of a matrix made of a high-molecular-weight polyolefin, such as polyethylene or polypropylene, and also contains a very finely divided mineral filler, such as silica, silicates, alumina, titanium oxide or water-insoluble mineral salts. The polyolefin matrix forms a network of communicating pores, the average diameter of which is between 0.2 and 5 $\mu$m and the volume of which may represent up to 85% of the volume of the medium. These pores allow the mineral filler to remain in the polyolefin matrix. The divided mineral filler represents 40 to 80% by weight with respect to the total weight of the printing-writing medium. Such a medium, which may be found commercially, for example under the trademark TESLIN® of PPG Industries, has the advantage of being strong over a wide temperature range and in humid environments, of being permeable to gases and of being able to be easily printed or written upon, in a lasting manner.

The medium is preferably used in the form of a thin sheet, especially one having a thickness of 100 to 250 $\mu$m, so that the composite remains sufficiently flexible while still maintaining a good tear strength.

The pressure-sensitive adhesive contains no plasticizer. Advantageously, it is deposited directly on the sheet of microporous medium, especially by coating, and is essentially formulated from an elastomer polymer material and a tackifying resin.

According to the invention, suitable elastomers for the elastomer polymer material are isoprene-based polymers and may comprise synthetic polyisoprenes, natural polyisoprenes or polyisoprenes copolymerized with polystyrene groups, such as, for example, the triblock elastomers normally referred to as SIS (styrene-isoprene-styrene). The components of these various families of isoprene-based polymers may be used alone or in a blend. Among the polymers which can be used, synthetic polyisoprenes, the AMW of which is between 400,000 and 800,000, and SIS-type triblock elastomers, the styrene content of which is between 10 and 40% by weight and preferably 15 to 25% by weight, are preferred, as are blends of these elastomers. In practice, the elastomers within the SIS family may also comprise a proportion of SI diblock polymers. In order to produce the preferred forms of the invention, blends of SIS-type triblock polymers and synthetic polyisoprene are chosen, the polyisoprene being present in an amount ranging from 20 to 80% by weight with respect to the total amount of elastomer.

In short, what is important in the elastomer polymer material of the composite according to the invention is the presence of polyisoprene groups. These groups are provided by an elastomer material chosen from the collection comprising:

(a) polyisoprenes, (b) copolymers of isoprene with at least one other ethylenically unsaturated monomer, which contain polyisoprene groups, (c) compositions of polyisoprene with other elastomers, and (d) blends thereof.

In this list, the copolymers in item (b) which are suitable are, in particular, triblock-type copolymers, such as SIS, and, where appropriate, diblock-type copolymers such as SI.

The tackifying resin necessary for the adhesive composition is chosen from rosin derivatives having an AMW of between 600 and 1500 and a softening point above 85° C. This particular selection allows adhesives to be obtained whose performance remains stable under severe operating conditions such as, for example, large temperature variations (especially from −30° C. to +125° C.) or exposure to high humidity. Rosin resins having an AMW of less than 600 result in adhesives which rapidly lose their adhesive strength because of adsorption of the components in the porous structure of the sheet of microporous medium. Rosin resins having an AMW of greater than 1500 do not allow a satisfactory adhesive strength to be obtained under all the operating conditions of the labelling material. The preferred resins according to the invention for producing the adhesive are esters of rosin and of polyols such as pentaerythritol or glycerol. It is also possible to use esters obtained by the reaction of hydrogenated rosin with these same polyols. Among rosin esters, it is preferred here to use products which have been stabilized [before esterification (i.e. rosin stabilization) or after esterification (i.e. ester stabilization)] by hydrogenation, by dismutation or by isomerization.

As indicted above, these rosin esters (whether hydrogenated or unhydrogenated) must have an AMW of greater than 600 and of less than 1500, and among these it is preferred to use esters obtained from stabilized rosin, which has an AMW of greater than 600 and of less than 1200 and a softening point above 85° C.

The AMW of the resin is determined by means of gel permeation chromatography analysis. It is known that resins derived from rosin by esterification with polyols result in mixtures of chemical compounds which depend simultaneously on the acid components of the rosin, on the stabilizing treatment (partial hydrogenation, dismutation or isomerization) applied to the said rosin and on the degree of esterification of the acids of the stabilized rosin with polyols, such as glycerol pentaerythritol. For such mixtures, it is therefore possible to determine only an average molecular mass, which will be close to that of the most representative species in the mixture. For this determination, the gel permeation chromatography method is used, calibration being by means of a known blend of polystyrenes (this being injected in solution in THF) and detection being by refractometry. The AMW is then determined as being the mass which corresponds to the top of the predominant peak.

The softening point is determined using the so-called "ring and ball" method (the method is defined in the ASTM E 28 standard).

The adhesive may also contain the usual additives, such as antioxidants, UV stabilizers and colorants.

Coating with the adhesive is carried out so as to deposit approximately 25 to 60 g of dry matter per m$^2$. The adhesive may be prepared in a solvent phase, in a manner known by those skilled in the art, by mixing the components with aliphatic solvents or the adhesive may be prepared by hot mixing without a solvent (hot-melt formulation). The coating operation is carried out using the transfer process: a non-stick film, which temporarily protects the composite, is coated with an adhesive in the form of a self-adhesive skin and, after the skin of adhesive has been dried and cooled, the microporous sheet of the printing-writing medium is calendered onto this skin of adhesive, where the said printing-writing medium can receive one or more printed or handwritten particulars. The protective non-stick film is, for example, a sheet of siliconized paper which will be removed, by peeling, only at the time of applying the composite (in particular, the label produced from the said composite) to the object to be identified.

The composite according to the invention, provided with its non-stick protector, may be printed by means of the inks normally used in the printing industry, using conventional techniques such as ink-jet printing, screen printing, flexography, offset printing or laser printing. It is also possible to print or write (manually) on the printing-writing medium of the composite while the said composite, especially in the form of an adhesive label, is put in place on an object. The ink used penetrates into the microporous printing-writing medium and the printed or written items of information cannot be erased if the ink used is stable under the environmental conditions withstood by the label. The particular choice of the components of the adhesive, which is combined with the microporous polyolefin printing-writing medium, makes it possible to obtain printable labels whose adhesion performance remains at a very high level under temperature conditions varying especially between −30° C. and +125° C. and in particular between −20° C. and +121° C.; the adhesion of the labelling composite according to the invention to, for example, objects made of a plastic based on EVA or based on a synthetic thermoplastic elastomer, is excellent. In particular, one of the applications of the self-adhesive composite according to the invention is for labelling blood bags whose wall is a sheet of very flexible plastic which essentially consists of EVA in the case of certain types of bag or of SEBS triblock elastomer in the case of other types of bag. The label stuck to the bag remains well fixed and exhibits no visual defect, despite the temperature and humidity constraints to which the blood bags are subjected during the sterilization phase (generally at 120–121° C.) and the freezing phase (generally at −20° C.); this good stability is particularly noticeable when the labels bear identification bar codes which remain legible only if the label does not deform.

Further advantages and features will be more clearly understood from the following description of the embodiment examples of the invention and of comparative examples. Of course, all these elements are in no way limiting but are provided by way of illustration.

EXAMPLE 1

The adhesive is formulated from 70 parts by weight of SIS triblock elastomer (containing 18% styrene) sold by Dexco Polymers under the trademark VECTOR® 4111, 30 parts by weight of polyisoprene sold by GOODYEAR under the reference NATSYN® 2200, 120 parts by weight of rosin resin esterified with pentaerythritol, sold by DRT under the reference DERTOLINE® P2L (the AMW is 1028 and the softening point is 98–99° C.) and 1 part by weight of sulphur-containing antioxidant (zinc dibutyldithiocarbamate). The solvent used for the formulation is an aliphatic petrol based on $C_6$–$C_7$ hydrocarbons. The siliconized side of a non-stick protective paper (sold by Sopal under the reference R1020) is coated with the adhesive so as to obtain, after drying, an adhesive coating of 40 to 45 g/m$^2$.

Next, a microporous and silica-filled sheet of high-molecular-weight polyethylene (polyethylene sold by PPG Industries under the reference TESLIN® sp 700) is calendered onto the unprotected side of the adhesive. The composite obtained is then printed, if necessary, and then cut up into adhesive labels.

The test of the adhesiveness of the labelling composite according to the invention thus obtained involves measuring the adhesive strength of a strip of the said printable self-adhesive composite to a sheet of SEBS-based flexible plastic (KRATON® G) taken from a PL732-type blood bag sold by Baxter. The adhesive strength is determined by the force required to disbond the label, which is fixed to the sheet of flexible plastic under precise and reproducible conditions. The disbonding (i.e. the separation of the complex) is carried out at 180° while keeping the complex product (flexible plastic sheet/composite) perpendicular to the direction of pulling, according to the diagram:

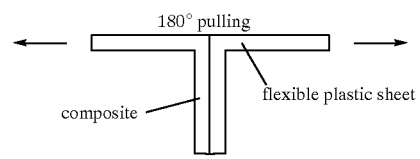

The pulling rate is 300 mm/min. Each specimen is tested (i) under normal conditions and (ii) after accelerated ageing (under the storage conditions before installation, i.e. with the non-stick protector) at 70° C. for 15 hours. The value of the adhesive strength on a sheet of glass is also measured on a control specimen and on a specimen "aged" under the same conditions, the separation of the complex being carried out at 180°.

The measured values from the tests carried out with the composite according to the invention show an adhesive strength of 750 g/cm (the width of the specimen is 1 cm) on the glass sheet and 2000 g/5 cm (the width of the specimen is 5 cm) on the flexible plastic film. After accelerated aging at 70° C. for 15 hours, the adhesive strength on glass is 700 g/cm and on plastic film 2250 g/5 cm, respectively.

EXAMPLE 2

The composite is obtained by coating (using transfer coating) a printing-writing medium, identical to that used in Example 1, with an adhesive prepared from 70 parts by weight of SIS (VECTOR® 4111), 30 parts by weight of polyisoprene (NATSYN® 2200), 120 parts by weight of a rosin-based resin, stabilized and esterified with pentaerythritol, having an AMW of about 942 and a softening point of 108–109° C. (FORAL® 105 E sold by Hercules) and 1 part by weight of antioxidant. The tests give an adhesive strength of 770 g/cm on a glass sheet and 1600 g/5 cm on a film of SEBS-based plastic (identical to that in Example 1).

After accelerated aging, adhesive strengths of 700 g/cm on glass sheet and 1700 g/5 cm on plastic film are obtained, respectively.

EXAMPLE 3

The adhesive is formulated, in the melt phase (hot-melt adhesive), using 20 parts by weight of SIS triblock elastomers (VECTOR® 49 4111), 80 parts by weight of polyisoprene (NATSYN® 2200), 160 parts by weight of a rosin ester with pentaerythritol (DERTOLINE® P2L) and one part by weight of antioxidant. The non-stick side of a one-sided siliconized paper (protective paper) is coated with the adhesive in an amount of 45 g/m² and then a film of microporous printing-writing medium (TESLIN® SP700) is calendered onto the exposed adhesive side of the resulting product. The tests carried out, as indicated above, on the composite thus obtained show an adhesive strength of 990 g/cm on glass and 3000 g/5 cm on plastic film. After accelerated aging (15 hours at 70° C.), the values obtained for the adhesion to glass and plastic film are 900 g/cm and 2700 g/5 cm, respectively.

EXAMPLE 4

A procedure similar to Example 1 is carried out, but by using 70 parts by weight of SIS elastomer containing 15% styrene blocks and 18% SI diblock (VECTOR® 4113 sold by Dexco), 30 parts by weight of polyisoprene (NATSYN® 2200), 120 parts by weight of resin based on a rosin ester with glycerol, having an AMW of 770 and a softening point of 115–116° C. (DERTOPOLINE® CG sold by DRT) and 1 part by weight of antioxidant. The composite thus obtained, subjected to the tests described above, shows an adhesive strength of 800 g/cm on glass and 2700 g/5 cm on plastic film, respectively, and after accelerated aging, an adhesive strength of 700 g/cm on glass and 2550 g/5 cm on plastic film, respectively.

EXAMPLE 5

A procedure similar to Example 1 is carried out, but by replacing the tackifying resin by the resin DERTOPOLINE® CG (the characteristics of which were given above). The transfer of the layer of adhesive to the TESLIN® film is carried out hot. The adhesive composite thus obtained has an adhesive strength of 1.3 kg/cm on glass and 2.5 kg/5 cm on plastic film. After accelerated aging, the adhesive strength on glass is greater than the strength of the TESLIN® film and reaches 3 kg/5 cm on plastic sheet.

COMPARATIVE EXAMPLES a) The formulation of Example 1 was repeated, but by replacing the tackifying resin by a 260 AMW methyl ester of rosin (sold under the trademark HERCOLYN® DE by Hercules). The adhesive strengths, determined as indicated above, are 70 g/cm on glass and 250 g/5 cm on SEBS-based plastic film (identical to that in Example 1). After aging, the adhesive strength is virtually zero on glass and zero on plastic film.

b) The adhesive strength of a composite made from a microporous medium identical to the medium used in Example 1 above and an acrylic adhesive commonly used for fixing a label to a plasticized PVC substrate was measured. The adhesion of such a composite to a SEBS-based plastic film (identical to that in Example 1) is less than 250 g/5 cm, which, even without aging, is very insufficient for an industrial application.

c) The formulation of the adhesive described in Example 1 was repeated, but by replacing the tackifying resin by a phthalate of abietic alcohol (sold under the trademark CELLOLYN® 21E by Hercules) having an average molecular weight of 590 and a softening point of 70° C. Studying a specimen of a composite obtained by coating a TESLIN® film with this adhesive results in adhesive strength values of 520 g/cm on glass sheet and 1000 g/5 cm on SEBS-based plastic film (identical to that in Example 1). After accelerated aging, the adhesive strength is no more than 140 g/cm on glass and 250 g/5 cm on plastic film. These values are insufficient for ensuring good labelling reliability.

The various examples of realization described above have the purpose of illustrating the invention and should not be regarded as being limiting. The composite formed by the sheet of polyolefin-based microporous printing-writing medium and the adhesive essentially comprising a polyisoprene elastomer and a rosin-based resin with an AMW of between 600 and 1200 and a softening point above 85° C., or even above 90° C., provides a novel labelling material particularly suitable for being adhesively applied to objects whose external surface is based on an SEBS-triblock elastomer or an EVA elastomer, the bond remaining lastingly stable under very variable temperature and humidity conditions. Thus, according to the invention a first embodiment is obtained which is preferred and novel, which consists of a sheet of microporous printing-writing medium and which is intended advantageously to be bonded to a receiving surface, essentially composed of an SEBS-type triblock elastomer, by means of an adhesive meeting the above mentioned requirements. Also obtained is a second embodiment which is preferred and novel and consists of a sheet of microporous printing-writing medium, advantageously intended to be bonded to a receiving surface, essentially composed of EVA, by means of an adhesive meeting the characteristics described above.

In practice, one of the preferred applications of the adhesive according to the invention is for labelling a receiving surface which is that of a blood bag whose gas-permeable material may either be an SEBS-triblock elastomer or an EVA elastomer.

What is claimed is:

1. Composite of the printing-writing medium, in which the said printing-writing medium consists of a polyolefin in sheet form and is provided on one of its sides with an adhesive, the said composite being characterized in that it consists of:

(A) a printing-writing medium in the form of a microporous sheet of polyolefin of high molecular weight, and (B) a pressure-sensitive adhesive without a plasticizer and containing
   (1) 90 to 160 parts by weight of a rosin resin having an average molecular weight (AMW) of between 600 and 1500 and a softening point above 85° C., per
   (2) 100 parts by weight of an elastomer polymer material consisting of or containing at least one polyisoprene compound.

2. Composite according to claim 1, characterized in that the microporous printing-writing medium based on a high-molecular-weight polyolefin furthermore contains 40 to 80% by weight of a finely divided mineral filler.

3. Composite according to claim 2, characterized in that the mineral filler is a silica.

4. Composite according to any one of claim 1, characterized in that the resin of the adhesive is an ester of rosin and of a polyol.

5. Composite according to claim 4, characterized in that the resin of the adhesive is an ester of rosin and of pentaerythritol.

6. Composite according to claim 4, characterized in that the resin of the adhesive is an ester of rosin and of glycerol.

7. Composite according to any one of claim 1, characterized in that the elastomer polymer material is a blend of polyisoprene and SIS triblock copolymer, the said blend advantageously comprising 20 to 80% by weight of polyisoprene with respect to the total weight of the said elastomer polymer material.

8. Pressure-sensitive-adhesive material in sheet form, characterized in that it consists of a composite of the printing-writing medium according to any one of claim 1, in which the said printing-writing medium has a thickness of between 100 and 250 µm and is coated with 25 to 60 g/m² of the said adhesive.

9. Pressure-sensitive-adhesive material in sheet form according to claim 8, characterize d in that it is intended to be adhesively applied to a receiving surface made of elastomer, especially of the SEBS or EVA type.

10. Pressure-sensitive-adhesive label, according to claim 8 and in that it is intended to be adhesively applied to a receiving surface made of an SEBS or EVA flexible plastic for identification, the said receiving surface especially being that of a blood bag.

* * * * *